(12) United States Patent
Park

(10) Patent No.: US 6,601,068 B1
(45) Date of Patent: Jul. 29, 2003

(54) HOME LOCATION REGISTER MANAGEMENT SYSTEM AND DATABASE MANAGEMENT METHOD IN MOBILE RADIO COMMUNICATION SYSTEM

(75) Inventor: Hyung Soo Park, Inchon-kwangyoksi (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/212,574

(22) Filed: Dec. 16, 1998

(30) Foreign Application Priority Data

Dec. 24, 1997 (KR) .......................... 1997-73254

(51) Int. Cl.[7] .............................................. G06F 17/30
(52) U.S. Cl. .......................................... 707/8; 707/104.1
(58) Field of Search .............................. 707/10, 8, 104, 707/200–201, 104.1, 101

(56) References Cited

U.S. PATENT DOCUMENTS

| | | | | |
|---|---|---|---|---|
| 5,263,155 A | * | 11/1993 | Wang | 707/8 |
| 5,553,280 A | * | 9/1996 | Fortier | 707/10 |
| 5,596,745 A | * | 1/1997 | Lai et al. | 707/103 |
| 5,781,908 A | * | 7/1998 | Williams et al. | 707/104 |
| 5,922,040 A | * | 7/1999 | Prabhakaran | 701/117 |
| 5,933,820 A | * | 8/1999 | Beier et al. | 707/1 |
| 5,974,044 A | * | 10/1999 | Ikeda et al. | 370/354 |
| 6,038,442 A | * | 3/2000 | Ueda et al. | 455/414 |
| 6,161,006 A | * | 12/2000 | Balachandran | 455/410 |

OTHER PUBLICATIONS

Lehman, Tobin J. et al., "A Study of Index Structures for Main Memory Database Management Systems", Proceedings of the Twelfth International Conference on Very Large Data Bases, Aug., 1986, pp. 294–303.

* cited by examiner

*Primary Examiner*—Maria N. Von Buhr
(74) *Attorney, Agent, or Firm*—Fleshner & Kim, LLP

(57) ABSTRACT

Provided with a home location register management system in a mobile radio communication system, the system including: a processor for analyzing an input signal and sensing the inherent attributes of information included in the input signal; a plurality of application programs receptive to the output signal of the processor to output database management commands based on the attributes; and a plurality of direct memory access query interfaces receptive to the output signals of the plural application programs to have access to a database related to the task of the corresponding application processor based on the attributes, at least two direct memory access query interfaces having access to the database simultaneously to perform an operation for managing the database.

22 Claims, 3 Drawing Sheets

HOME LOCATION REGISTER MANAGEMENT SYSTEM AND DATABASE MANAGEMENT METHOD IN MOBILE RADIO COMMUNICATION SYSTEM

BACKGROUND OF THE INVENTION

1. Field of the Invention

The present invention relates to a home location register management system having a database in the mobile radio communication network. Especially, it relates to a home location register management system and a database management method provided in a home location register (HLR) in the mobile radio communication network by which a plurality of application programs provided in the HLR have access to a database system of the HLR in a simultaneous manner, performing a database management operation with a view to rapidly answering the request of plural mobile subscribers for various services.

2. Description of Related Art

A home location register normally provided in the mobile radio communication network is located at a fixed position in a given network with respect to a plurality of mobile subscribers and has the function of an intra-network database to manage subscriber and location information for offering communication services. The home location register is connected to a plurality of mobile exchanges, which control communications with plural mobile subscribers.

FIG. 1 is a concept diagram of a mobile radio communication network illustrating radio communications between a general home location register and a plurality of mobile exchanges.

Referring to FIG. 1, when plural mobile subscribers $21a$–$21n$ and $31a$–$31n$ in request for a communication service or supplementary service, mobile exchanges 12 and 13 receive a radio signal for this via an usual signal path and, if any information retrieval or change is needed, gain access to a database provided in a home location register 11 in a predetermined sequence, executing required operations. The home location register 11 is connected to a plurality of mobile exchanges 12–14 for mutual mobile radio communications.

The related mobile exchanges are in communications with the home location register 11 to exchange information via a protocol such as IS-41C such that each of them receives information with attributes concerning information retrieval or change as it requested.

A database management method by the conventional home location register 11 will be described below in connection with FIG. 2.

For example, a mobile subscriber requests for a database management such as call connection, supplementary service, or change of location information. Sensing the request of the mobile subscriber, a related mobile exchange gets in communications for information with the home location register 11 via a protocol such as IS-41C, transferring the service function requested by the mobile subscriber to the home location register 11. It means, mutual communications are established between the application programs provided in each mobile exchange and the home location register 11. The plural application programs provided in the home location register 11 gain access to the database system built in the home location register 11 in the order of priority predetermined based on the property of the service requested by the mobile subscriber, retrieving or changing information.

As shown in FIG. 2, a database management system (DBMS) 43 determines the final order of priority in consideration of the order of priority predetermined based on the property and content of the service requested by the mobile subscriber when a plurality of application programs $44a$–$44n$ gain access to a database 41. The reason for this is to prevent any fatal damages upon the system for managing a data stored in the database 41 in such a way that while any one of plural application programs $44a$–$44n$ is executed, the other application programs get access to the database 41 to perform a required management operation.

There may be many factors in supporting numerous subscribers and offer various services more rapidly in the mobile radio communication network. The most important factor is to improve the speed at which a plurality of application programs APs provided in the home location register gain access to the database. This is because the database management system 43 gets access to the data base in the order of priority predetermined in case where the current application program gets access to the database to perform a desired management operation.

The prior art cited in the present invention refers to the home location register (model name DCN-HLR) of SK Telecom in Korea, which can support 500 thousand mobile subscribers to the maximum. In addition, about 500 mobile subscribers per second can get access to the database of the home location register to perform a required management operation.

When a plurality of application programs get access to the database in the prior art, however, the database management system controls the application programs to gain access to the database orderly in consideration of the order of the mobile subscribers that requested the service and the order of priority predetermined by the database system itself. DCN-HLR of SK Telecom can provide services for at most about 500 mobile subscribers that corresponds to $\frac{1}{1000}$ of 500 thousand subscribers per second. When an excessive number of mobile subscribers (more than about 500 persons per second) request for services, there is a limitation in rapidly processing different supplementary services such as call connection because the speed at which application programs provided in the home location register gain access to the database is delayed.

Furthermore, when one subscriber requests for a service, for example, call connection, so many procedures are required to offer the service. These procedures are performed by way of communications between the respective application programs and the database. As the application programs have access to the database in the order of priority predetermined, the memory of the application programs to be used increases with an increase in the number of subscribers requesting for services.

SUMMARY OF THE INVENTION

Accordingly, an object of the present invention is to provide a home location register management system and a database management method in the mobile radio communication system which are adapted to have access to a database based on the attributes related to the services simultaneously requested by a plurality of mobile subscribers and perform a desired database management operation.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

In an aspect of the present invention to accomplish the object, at least two direct memory access query interfaces have access to the database provided in a home location register based on the inherent attributes of an input signal under the control of a home location register management system.

Preferably, the home register management system includes: a database provided in the home location register; a processor for analyzing an input signal and sensing the inherent attributes of information included in the input signal; a plurality of application programs receptive to the output signal of the processor to output database management commands based on the attributes; and a plurality of direct memory access query interfaces receptive to the output signals of the plural application programs to have access to a database related to the task of the corresponding application processor based on the attributes. At least two direct memory access query interfaces have access to the database simultaneously to perform an operation for managing the database.

In another aspect of the present invention to accomplish a second object, at least two direct memory access query interfaces have access to the database simultaneously based on the inherent attributes of an input signal to perform an operation for managing the database.

Preferably, a database management method of a home location register management system in a mobile radio communication system includes the steps of: analyzing an input signal and sensing the inherent attributes of information included in the input signal; receiving the input signal and outputting database management commands based on the attributes; and having access to the database simultaneously based on at least one of the attribute according to the database management commands and performing an operation for managing the database.

Accordingly, when the present invention is applied to the home location register, use of the database management system is not required and the time required for the application programs to have access to the database is reduced such that more subscribers can be supported for the same period of time and the memory of the application programs can be reduced, enhancing the performance of the home location register.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

Figure 1:
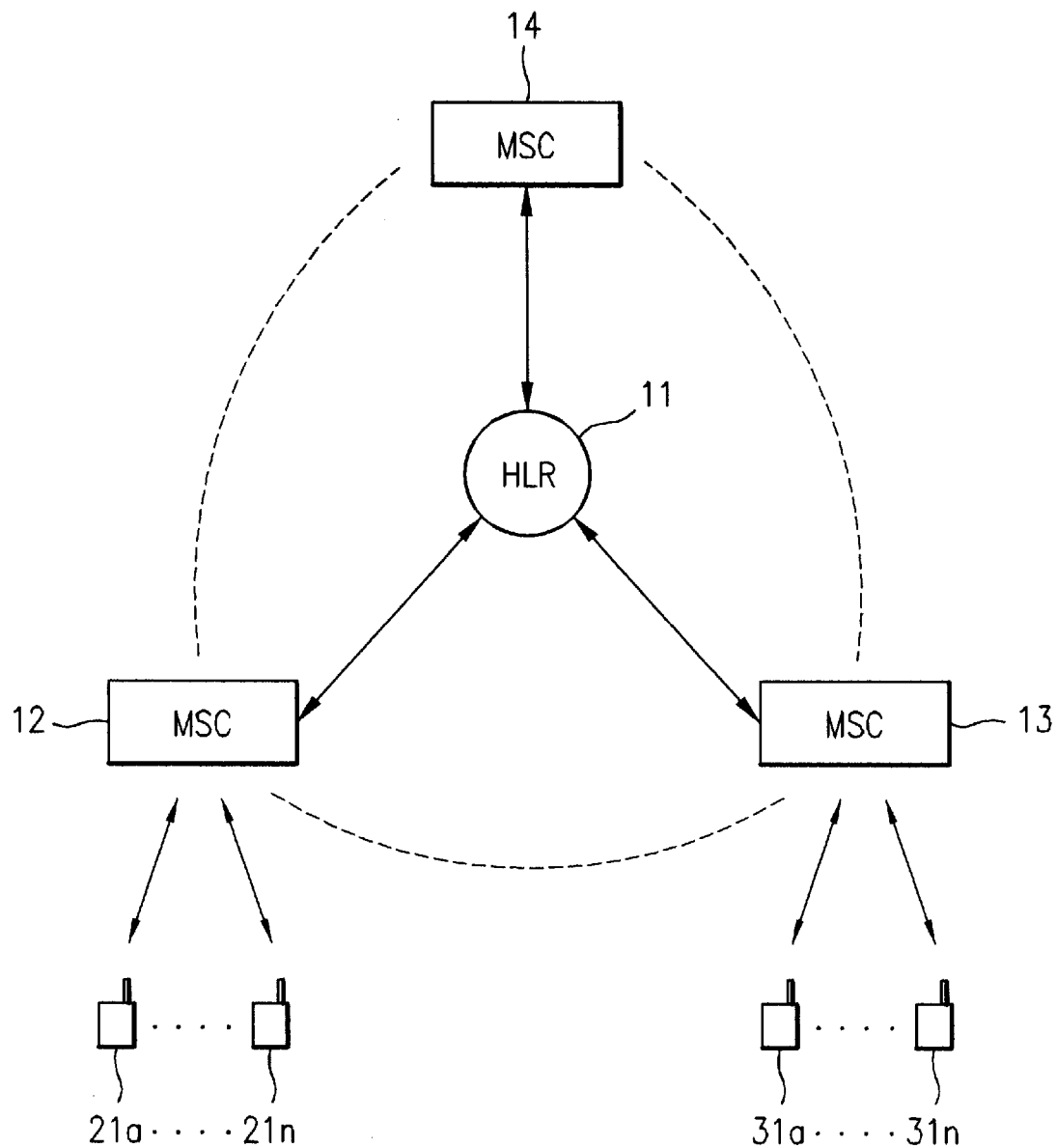
FIG. 1 is a concept diagram of a mobile radio communication network for illustrating a radio communication between a general home location register and mobile exchanges.
Figure 2:
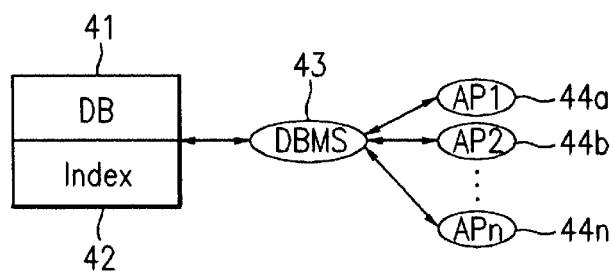
FIG. 2 is a concept diagram illustrating the state that a plurality of application programs gain access to a database in a home location register according to prior art.
Figure 3:
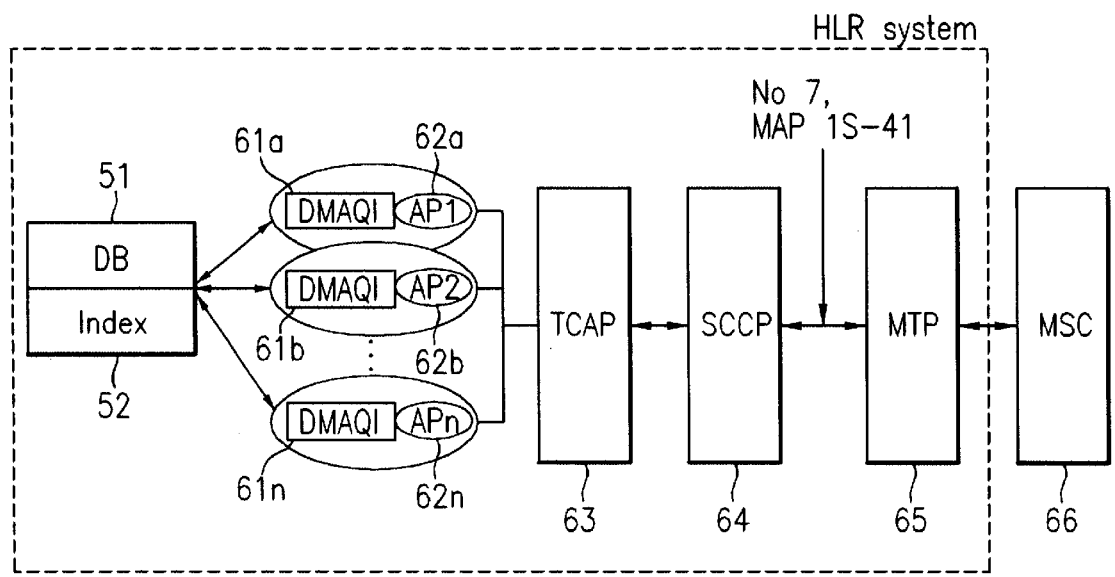
FIG. 3 is a concept diagram illustrating the state that a plurality of application programs gain access to a database in a home location register according to the present invention.

FIG. 3 is a concept diagram illustrating the state that a plurality of application programs gain access to a database in a home location register according to present invention.

Referring to FIG. 3, there are included a database 51, an index 52, a processor 63 for analyzing input signals by the request of a mobile subscriber for a certain service and dividing the input signals according to the attributes of information included in the input signals, a plurality of application programs 62a–62n receptive to the divided input signals to output a database management command based on the attributes, and a plurality of direct memory access query interfaces 61a–61n receptive to the output signals of the plural application programs 62a–62n to gain access to the database related to the task of the corresponding application program based on the attributes. The processor 63 is a transaction capabilities application part (TCAP). Reference numeral 64 indicates a signal connection control part (SCCP) and reference numeral 65 denotes a message transfer part (MTP).

The message supplied to the respective application programs 62a–62n by the processor 63 is composed of a dialog ID to identify the message, an operation ID to identify the application program, and a parameter indicating the maximum length of a parameter required to operate the related application program.

The processor 63 transfers a message to the respective application programs via the operation ID. The application program analyzes the parameter included in the received message, retrieving or changing the database 51 by use of the direct memory access query interfaces 61a–61n according to the result of analysis.

Hereafter, an operation and database management method of a home location register according to the present invention will be described below.

As shown in FIG. 3, the database in the mobile radio communication network is a database for subscriber information, an index 52 is an index structure, direct memory access query interfaces (DMAQIs) 61a–61n are connection interfaces between application programs 62a–62n and database 51. The direct memory access query interfaces 61a–61n are interfaces that gain direct access to the database 51 to process each service of mobile subscribers requested by the mobile exchanges 66 and perform functions such as retrieval and change of information in the unit of attribute of services.

When a call connection service is requested by use of a certain mobile subscriber (MS) in the mobile radio communication network, the related mobile exchange 66 senses the request to communicate with the home location register by using the standard protocol such as IS-41C. Then, specified application programs 62a–62n provided in the home location register retrieves the database 51 storing subscriber information to examine whether or not the mobile subscriber requesting for the call connection service is in the normal state. It means, a judgement is formed as to whether or not the current user is an illegal user. If the user is a legal user, the application programs 62a–62n permits the service to be offered by using information concerning the current location of the mobile subscriber or information needed to provide the service.

So many procedures are required for a subscriber to connect a call. These procedures are executed by the respective application programs 62a–62n provided in the home location register. The application programs 62a–62n include an application program to change location information when the subscriber moves to a new location, an application program to supply location information when a call connection is tried, an application program to examine whether the subscriber is in the normal state, an application program to activate or deactivate a supplementary service, and an application program to change the state of the supplementary service. These application programs 62a–62n gain access to the database 51 to retrieve necessary information or change a specified attribute field. Retrieval and change of information can be independently performed and information can be changed selectively according to the retrieval result.

In a case where multiple subscribers request for different services separately as characteristic to the mobile radio communication, the application programs 62a–62n each corresponding to the attribute peculiar to each service can have access to the database 51 independently. That means, the direct memory access query interfaces (DMAQIs) 61a–61n for direct interface between the application programs 62a–62n and the database 51 analyze the attributes of the services requested by the mobile subscribers and the application programs 62a–62n gain access to the database 51 simultaneously in the unit of attributes, performing operation such as information retrieval, change, or retrieval and change of information.

Figure 4:
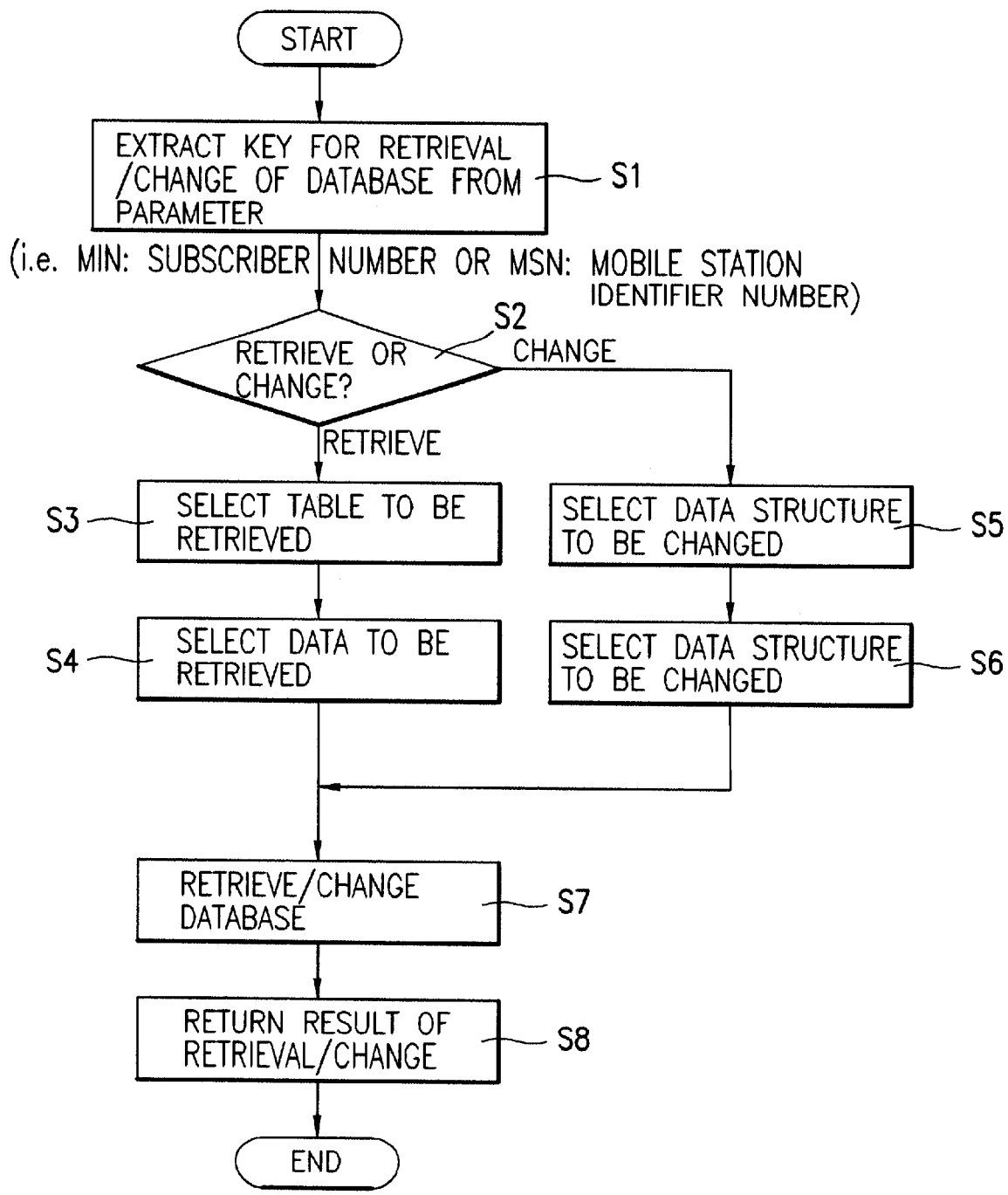
FIG. 4 is a flow chart showing the retrieval/change operation according to one preferred embodiment of the present invention.

Next, the procedure for retrieving and changing the database 51 with the direct memory access query interfaces (DMAQIs) 61a–61n is described in connection with FIG. 4.

First, the respective application programs 62a–62n extract a key for retrieving/changing the database, for example, mobile identification number (MIN) or mobile serial number (MSN) from the parameter included in the message supplied by the processor 63, in step S1. A judgement is formed as to whether retrieval or change of information is requested, in step S2. If retrieval of information is requested, a table to be retrieved is selected, in step S3, and the structure of a data to be retrieved is determined, in step S4. The data structure to be retrieved includes a table ID indicating a table identifier, an attribute ID indicating a key identifier, an attribute value indicating the actual key value such as MIN or MSN, and a tuple ID indicating a retrieval starting location.

On the other hand, if the judgement formed in step S2 indicates that change of information is requested, a table to be changed is selected, in step S5, and the structure of a data to be changed is determined, in step S6. The data structure to be changed includes a table ID indicating a table identifier, an attribute ID indicating a key identifier, an attribute value indicating the actual key value such as MIN or MSN, a tuple ID indicating a retrieval starting location, an update count indicating the number of attributes to be changed, an update list indicating the ID list of the attributes to be changed, and an update value indicating the actual value of each attribute to be changed.

Subsequently, the database is retrieved or changed in accordance with the requests of the respective application programs 62a–62n, in step S7. It is necessary to retrieve the database before performing change of the database. After the retrieval of the database is successfully completed, the direct memory access query interfaces (DMAQIs) 61a–61n change the database 51 by using the update count, the update list indicating the ID list of the attributes to be changed, and the update value indicating the actual value of the attributes that are included in the data to be changed. The result of retrieval or change returns to the subscriber that requested information, in step S8. If the operation fails, a proper error code (value smaller than zero) is carried back to the mobile subscriber. For example, an error code, –211 is applied back to the mobile subscriber when a desired record does not exist.

The concept of the present invention is contrived on the basis of the fact that a plurality of application programs may have access to the database at one time but hardly change the same attribute simultaneously.

Such a characteristic can be understood better by analysis of the functions of the application programs and the subscriber database. As shown in Table 1, for example, the respective application programs can retrieve or change the attributes having different service contents, or change them based on the result of retrieval.

TABLE 1

| Application Program | Attribute (related to) | Type of Question |
|---|---|---|
| Changing Location Information | Location Information | Change |
| Call Connection | Location Information | Retrieval |
| Checking State of Subscriber | State of subscriber Such As Delinquency or Steal | Retrieval and change |
| Changing State of Supplementary Service | Supplementary Service | Change |
| Offering Various Supplementary Services | Supplementary Service | Retrieval |

According to one preferred embodiment of the present invention, attributes to be retrieved or changed include point code subsystem number (PCSSN), visitor location resister identification (VLRID) and mobile station roaming number (MSRN) Attributes to be changed also include the state of supplementary service such as changing the flags concerning call forwarding (CF), call holding (CH), voice mail service (VMS), fax mail service (FMS), short message service (SMS), three way call (TWC) and conference call (CC).

In addition, attributes to be retrieved and then changed according to the result of retrieval include subscriber authorized attributes such as stolen subscriber (STLN), delinquent account subscriber (DAS), authorized value & period (AUTH) and personal identification number (PIN), and attributes concerning the processing of supplementary services such as call forwarding number (CFNO), voice mail system identification (VMSI), voice mail system BOX number (VMSBOXNO), short message system address (SMSADDRESS) and short message service delivery pending flag (SMSDPF).

Unlike the prior art, according to the present invention, a plurality of application programs 61a–61n provided in the home location register gain access to the database 51 independently to retrieve or change the content of services in the unit of attributes. Considering such a special environment of the mobile radio communication, the application programs 61a–61n can have access to the database 51 without passing the database management system as needed in the prior art.

Such as in the present invention described above, when a plurality of mobile subscribers request for different services almost at the same time, the application programs based on the attributes of each service gain access to the database independently and perform a desired database management operation. It is thus possible to reduce the memory of the application programs to be used as well as the time for access to the database, as a consequence of which the performance of the home location register can be enhanced.

It will be apparent to those skilled in the art that various modifications and variations can be made in the present invention without deviating from the spirit or scope of the invention. Thus, it is intended that the present invention cover the modifications and variations of this invention provided they come ,within the scope of the appended claims and their equivalents.

What is claimed is:

1. A home location register management system in a mobile radio communication system, comprising:

a database provided in a home location register;

a processor coupled to analyze an input signal and sense inherent attributes of information included in the input signal;

a plurality of application programs used to connect a call, coupled to receive an output signal of the processor to output database management commands based on the attributes; and a plurality of direct memory access query interfaces coupled to receive output signals of the plurality of application programs to provide access to the database related to the task of the corresponding application program based on the attributes, wherein at least two direct memory access query interfaces have simultaneous access to the database to perform an operation for managing the database.

2. The home location register management system as defined in claim 1, wherein the processor is a processor having a transaction processing function.

3. The home location register management system as defined in claim 1, wherein the message structure of a signal applied from the processor to the respective application programs includes a dialog ID indicating a related message, an operation ID indicating an application program identifier, and a parameter indicating the maximum length of the parameter required to operate the related application program.

4. The home location register management system as defined in claim 3, wherein the processor transfers the message to the respective application programs in accordance with the operation ID.

5. The home location register management system as defined in claim 1, wherein the attributes are retrieved, changed, or retrieved and then changed according to the result of retrieval.

6. The home location register management system as defined in claim 1, wherein a data structure comprises a table ID indicating a table identifier, an attribute ID indicating a key identifier, an attribute value indicating the actual key value such as MIN or MSN, and a tuple ID indicating a retrieval starting location.

7. A home location register management system in a mobile radio communication system the improvement comprising at least two direct memory access query interfaces coupled to receive corresponding input signals associated with a call connection request and each having simultaneous access to a home location register database based on inherent attributes of the input signal, to manage the database.

8. The home location register management system as defined in claim 7, wherein the attributes are retrieved, changed, or retrieved and then changed according to the result of retrieval.

9. A database management method of a home location register management system in a mobile radio communication system, comprising:

analyzing an input signal and sensing inherent attributes of information included in the input signal;

dividing the input signal according to the attributes;

receiving the divided input signal by corresponding ones of a plurality of application programs and outputting database management commands to corresponding direct memory access query interfaces (DMAQI) configured to provide direct access to a database based on the attributes; and providing at least two of the DMAQIs with simultaneous access to the database based on at least one of the attributes according to the database management commands and performing an operation for managing the database.

10. The database management method as defined in claim 9, wherein the management commands are retrieved, changed, or retrieved and then changed according to the result of retrieval.

11. The database management method as defined in claim 9, wherein the database management operation comprises:

extracting a key for retrieving or changing the database from parameters included in an input message;

judging from the result of the extracting step as to whether retrieval operation is requested or change operation is requested;

selecting a table to be retrieved or changed and determining the structure of a data to be retrieved or changed according to the result of the judging step; and retrieving or changing the database by using the determined data structure.

12. The database management method as defined in claim 11, wherein the key is a mobile identification number (MIN) or mobile serial number (MSN).

13. The database management method as defined in claim 11, wherein the data structure to be retrieved includes a table ID indicating a table identifier, an attribute ID indicating a key identifier, an attibute value indicating the actual key value such as MIN or MSN, and a tuple ID indicating a retrieval starting location.

14. The home location register management method as defined in claim 11, wherein the data structure to be changed includes a table ID indicating a table identifier, an attribute ID indicating a key identifier, an attibute value indicating the actual key value such as MIN or MSN, a tuple ID indicating a retrieval starting location, an update count indicating the number of attributes to be changed, an update list indicating the ID list of the attributes to be changed, and an update value indicating the actual value of each attribute to be changed.

15. The database management method as defined in claim 9, a proper error code is carried back when the database management operation fails.

16. The database management method as defined in claim 11, wherein the retrieval operation is to selectively retrieve point code subsystem number, visitor location register identification, and mobile station roaming number.

17. The database management method as defined in claim 11, wherein the change operation is to selectively change point code subsystem number, visitor location register identification, and mobile station roaming number.

18. The database management method as defined in claim 11, wherein the change operation is to selectively change the state of supplementary services.

19. The database management method as defined in claim 18, wherein changing the state of supplementary services is to selectively change flags concerning call forwarding, call holding, voice mail service, fax mail service, short message service, three way call and conference call.

20. The database management method as defined in claim 11, wherein the attributes to be retrieved and then changed according to the result of retrieval include attributes related to subscriber authorized verification or supplementary service processing.

21. The database management method as defined in claim 20, wherein the attributes related to subscriber authorized verification include identification of stolen subscriber, delinquent account subscriber, authorized value & period and personal identification number.

22. The database management method as defined in claim 20, wherein the attributes related to supplementary service processing include call forwarding number, voice mail system identification, voice mail system BOX number, short message system address and short message service delivery pending flag.

* * * * *